United States Patent
Durkee et al.

(10) Patent No.: US 10,228,614 B2
(45) Date of Patent: Mar. 12, 2019

(54) INTEGRATED PROJECTION SCREEN

(71) Applicant: MILESTONE AV TECHNOLOGIES LLC, Eden Prairie, MN (US)

(72) Inventors: Steven Durkee, Eden Prairie, MN (US); Rob Zurn, Warsaw, IN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 0 days.

(21) Appl. No.: 14/437,386

(22) PCT Filed: Mar. 14, 2013

(86) PCT No.: PCT/US2013/031601
§ 371 (c)(1),
(2) Date: Apr. 21, 2015

(87) PCT Pub. No.: WO2014/070234
PCT Pub. Date: May 8, 2014

(65) Prior Publication Data
US 2015/0277220 A1     Oct. 1, 2015

Related U.S. Application Data

(60) Provisional application No. 61/720,794, filed on Oct. 31, 2012.

(51) Int. Cl.
*G03B 21/58*     (2014.01)
*G06F 3/042*     (2006.01)
*H04N 7/15*     (2006.01)

(52) U.S. Cl.
CPC ........... *G03B 21/58* (2013.01); *G06F 3/0425* (2013.01); *H04N 7/15* (2013.01)

(58) Field of Classification Search
CPC ...................................................... G03B 21/56
(Continued)

(56) References Cited

U.S. PATENT DOCUMENTS 5,548,356 A * 8/1996 Portman ................ G03B 21/58
                                                                                    353/13
5,755,504 A * 5/1998 Matsunaga .......... G03B 21/567
                                                                                   353/122
(Continued)

FOREIGN PATENT DOCUMENTS

CN        201886702 U     6/2011
DE        20303397 U1    10/2003
(Continued)

OTHER PUBLICATIONS

International Search Report and Written Opinion of the International Searching Authority for PCT/US2013/031601 filed Mar. 14 2013, dated Jul. 26, 2013, 10 pages.
(Continued)

*Primary Examiner* — Christopher E Mahoney
(74) *Attorney, Agent, or Firm* — Patterson Thuente Pedersen, P.A.

(57) ABSTRACT

Systems and methods for more effectively locating cameras, controllers, and other interactive devices in conjunction with projection screens. A projection screen includes a screen presenting a surface suitable for projecting an image thereon, the screen having a bottom rail and an interactive device operably coupled to the bottom rail of the screen, the interactive device communicatively coupled to a communicating device. The interactive device may be a video camera, a sensor, or a controller.

15 Claims, 4 Drawing Sheets

(58) Field of Classification Search
USPC .................... 359/443; 348/14.01, 14.02
See application file for complete search history.

(56) References Cited

U.S. PATENT DOCUMENTS

| | | | |
|---|---|---|---|
| 6,616,284 B2* | 9/2003 | Yaniv | G03B 21/28 353/122 |
| 7,911,580 B2* | 3/2011 | Read | E04H 3/22 352/11 |
| 8,567,955 B2* | 10/2013 | Amm | G06F 1/1605 348/207.1 |
| 9,022,575 B2* | 5/2015 | Hsu | G03B 21/10 353/72 |
| 2003/0214710 A1* | 11/2003 | Takahashi | G02B 27/225 359/443 |
| 2005/0224545 A1* | 10/2005 | Boschma, Jr. | E04H 15/20 224/403 |
| 2006/0181792 A1* | 8/2006 | Plaster | B60R 1/00 359/857 |
| 2008/0094588 A1 | 4/2008 | Cole | |
| 2009/0052712 A1 | 2/2009 | Trelohan | |
| 2011/0102538 A1 | 5/2011 | Tan | |
| 2012/0140017 A1 | 6/2012 | Hong et al. | |

FOREIGN PATENT DOCUMENTS

| | | |
|---|---|---|
| FR | 2 875 051 A1 | 3/2006 |
| JP | 05-268597 A | 10/1993 |
| JP | 2003-153126 A | 5/2003 |
| JP | 2004147307 A | 5/2004 |
| JP | 2013025014 A * | 2/2013 |
| KR | 10-2003-0090862 A | 12/2003 |
| KR | 10-2011-0054249 A | 5/2011 |
| WO | WO 2012/124929 A2 | 9/2012 |

OTHER PUBLICATIONS

PCT Notification Concerning Transmittal of International Preliminary Report on Patentability, International Preliminary Report on Patentability, and Written Opinion of the International Searching Authority for PCT/US2013/031601, dated May 14, 2015, 7 pgs.
Chinese Office Action and Search Report for Application No. 201380057406.7 filed Oct. 1. 2015, dated Jan. 22, 2016 (7 pgs.).
Extended European Search Report for co-related EP Application No. 13850053.3, dated May 10, 2016 (7 pgs.).
Translation of Second Chinese Office Action and Search Report for Application No. 201380057406.7, dated Sep. 7, 2016 (10 pages).
Search Report for Patent Application No. 201380057406.7, dated Feb. 24, 2017 (Search Report (1 pg) and Translation (1 pg) 2 pgs.

* cited by examiner

INTEGRATED PROJECTION SCREEN

RELATED APPLICATIONS

This application is a National Phase entry of PCT Application No. PCT/US2013/031601 filed Mar. 14, 2013 which application claims the benefit of U.S. Provisional Patent Application No. 61/720,794, filed Oct. 31, 2012, the entire disclosures of which are incorporated herein by reference.

FIELD OF THE INVENTION

The present invention relates to projection screens, and more specifically to integration of other devices with projection screens in a presentation room environment.

BACKGROUND OF THE INVENTION

Dedicated projection screens are a common feature in conference rooms, lecture halls, and other settings where presentations are made to groups of people. A drawback of prior projection screens, however, is that the screen itself can sometimes interfere with the placement of other electronic devices that facilitate interaction with the presenter, the audience, and others who may not be present in the room. For example, it is often desirable to locate a video camera in proximity to the projection screen to facilitate video conferencing with others at a remote location. In order that the camera is not blocked by the projection screen, however, it is necessary to locate the camera above, below, or to the side of the screen. Such displacement of the video camera often leads to undesirable camera angles or causes portions of the room to lack camera coverage.

Interactive devices such as controllers are also often used with projection equipment. Again, the receiver for the controller must be placed in a position in which it will not be blocked by the screen itself, and therefore such receivers are often placed above, below, or to the side of the screen. Such placement can lead to "dead spots" where the controller is less than effective for controlling the presentation.

What is needed is are systems and methods for more effectively locating cameras, controllers, and other interactive devices in conjunction with projection screens to address the drawbacks of prior systems and methods.

SUMMARY OF THE INVENTION

Embodiments of the present invention address the need of the industry for systems and methods for more effectively locating cameras, controllers, and other interactive devices in conjunction with projection screens to address the drawbacks of prior systems and methods.

In an embodiment, a projection screen includes a screen presenting a surface suitable for projecting an image thereon, the screen having a bottom rail and an interactive device operably coupled to the bottom rail of the screen, the interactive device communicatively coupled to a communicating device. The interactive device may be a video camera, a sensor, or a controller.

In embodiments of the invention, the interactive device may be communicatively coupled to the communicating device with a wireless connection or with a wired connection. The interactive device may be integrated with the bottom rail of the screen or separately attached to the bottom rail of the screen.

In further embodiments, a projection system includes a projector, a screen presenting a surface suitable for displaying an image projected by the projector thereon, the screen having a bottom rail, and an interactive device operably coupled to the bottom rail of the screen, the interactive device communicatively coupled to a communicating device.

BRIEF DESCRIPTION OF THE DRAWINGS

The embodiments of the present invention may be more completely understood in consideration of the following detailed description of various embodiments in connection with the accompanying drawings, in which.

Figure 1:
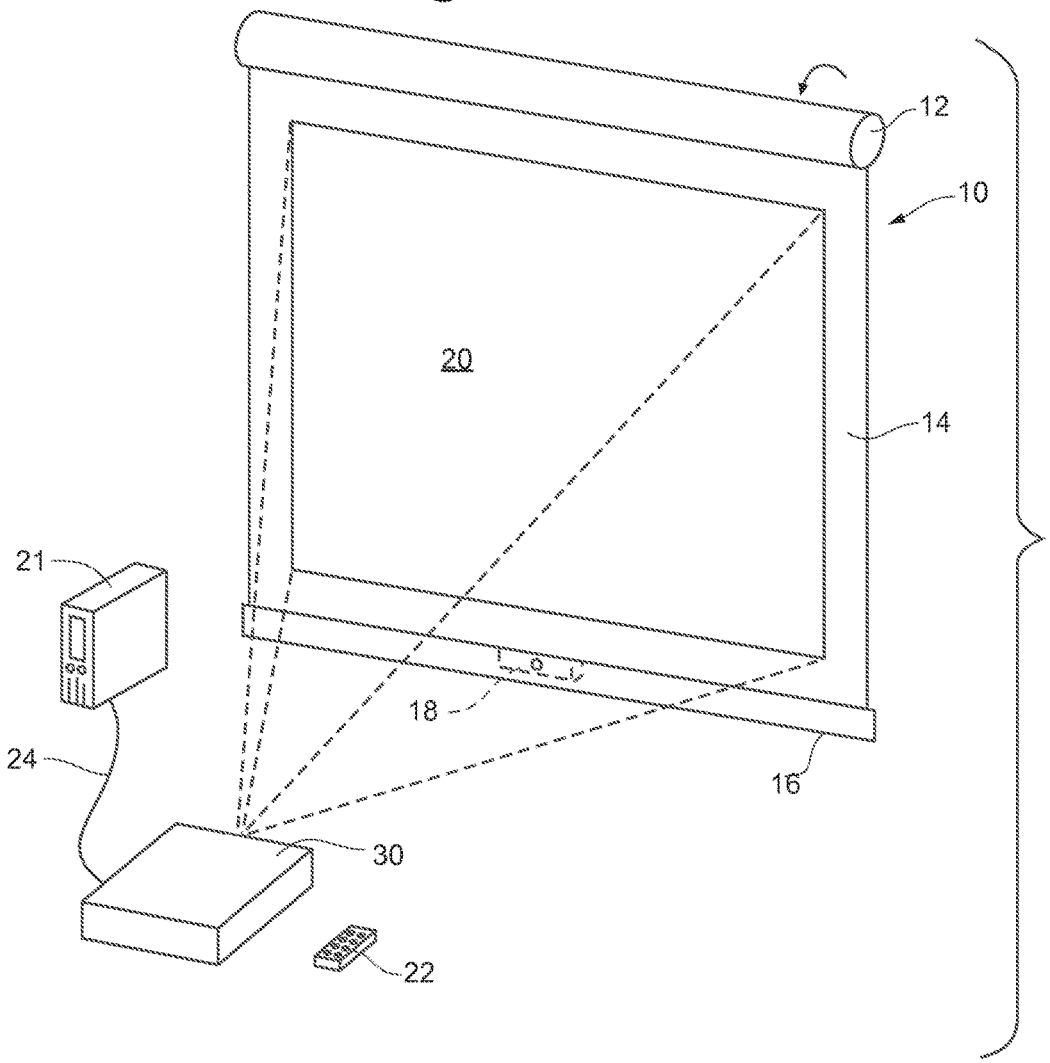
FIG. 1 is a front isometric view of a projector and projection screen with an interactive device integrated in the bottom rail of the screen, with the screen depicted in a rolled-down position.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

In FIG. 1 there is depicted a projection screen apparatus 10 according to an embodiment of the invention. Projection screen apparatus 10 generally includes screen roller device 12, screen 14, bottom rail 16, and interactive device 18. FIG. 1 also depicts an isometric image 20 projected with projector 30 on screen 14. The details of screen roller device 12, screen 14, and bottom rail 16 as depicted in FIG. 1 are generally the same as are commonly available in the prior electric and manual roll-down screens available from Da-Lite® Screen Company of Warsaw, Ind., and are thus not further described in detail here.

Figure 2:
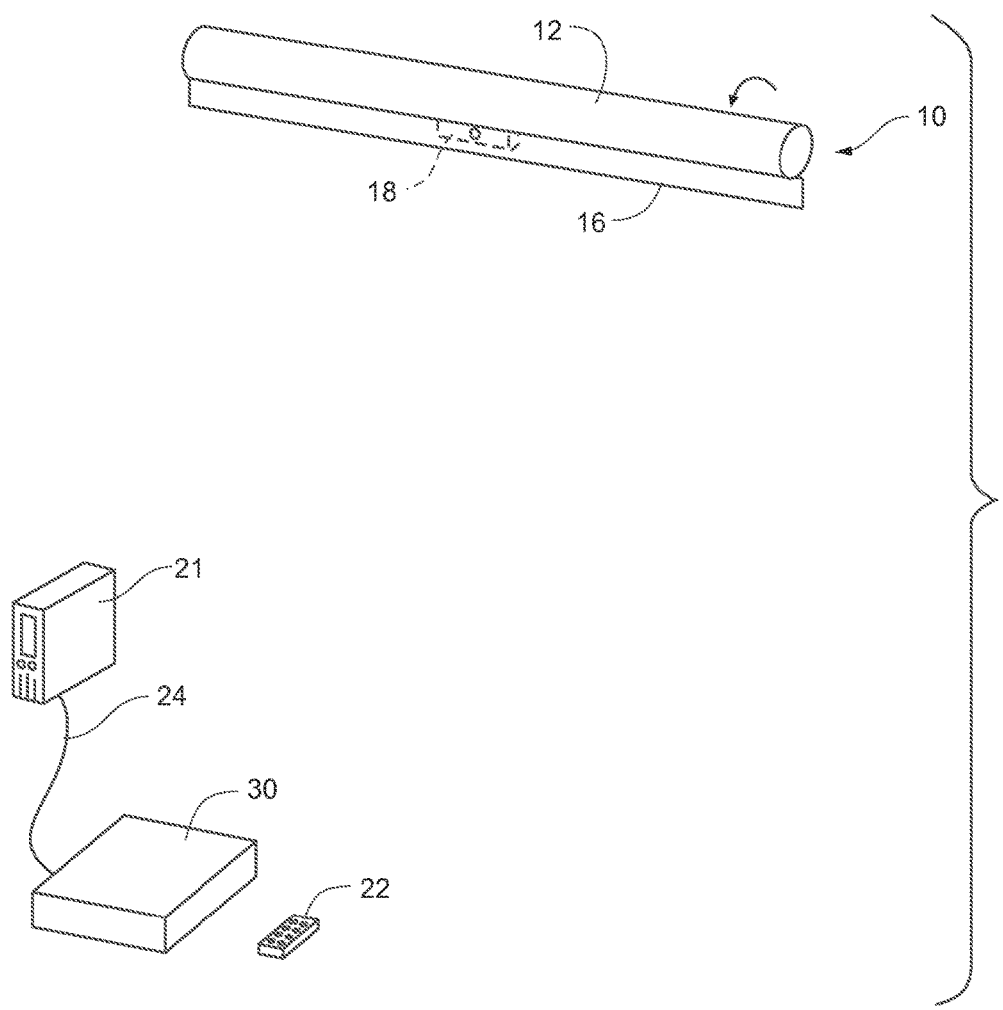
FIG. 2 is a front isometric view of the projector and projection screen of FIG. 1, with the screen depicted in a rolled-up position.

According to the embodiment of the invention depicted in FIGS. 1 and 2, interactive device 18 is included in the bottom rail 16 of projection screen apparatus 10. Interactive device 18 may be, without limitation, a video camera, sensor, or controller communicatively coupled with a communicating device 21, which may be a computer, processor, or other device including a processor such as a video game console (Xbox, PlayStation®, Wii®, etc.) or internet streaming device, for facilitating real-time interaction with the presenter, audience, or others at a remote location. The presenter or controller of the presentation may use remote device 22 to facilitate interaction with communicating device 21 or the interactive device 18. As depicted in FIG. 1, the communicative coupling between interactive device 18 and communicating device 21 may be by wireless means as commonly known in the art such as WiFi or Bluetooth®.

Communicating device 21 may be communicatively coupled with projector 30 by wireless means, or with a wired connection 24.

The location of the interactive device 18 in the bottom rail 16 of the projection screen apparatus 10 ensures that the interactive device 18 is never blocked by screen 14, regardless of whether screen 14 is rolled up on screen roller device 12 as depicted in FIG. 2, fully unrolled as depicted in FIG. 1, or at some intermediate position. Further, the interactive device can be generally centrally horizontally located relative to screen 14, thereby facilitating camera or controller positioning so as to avoid "dead-spots" and areas within a presentation room that do not have coverage.

Figure 3:
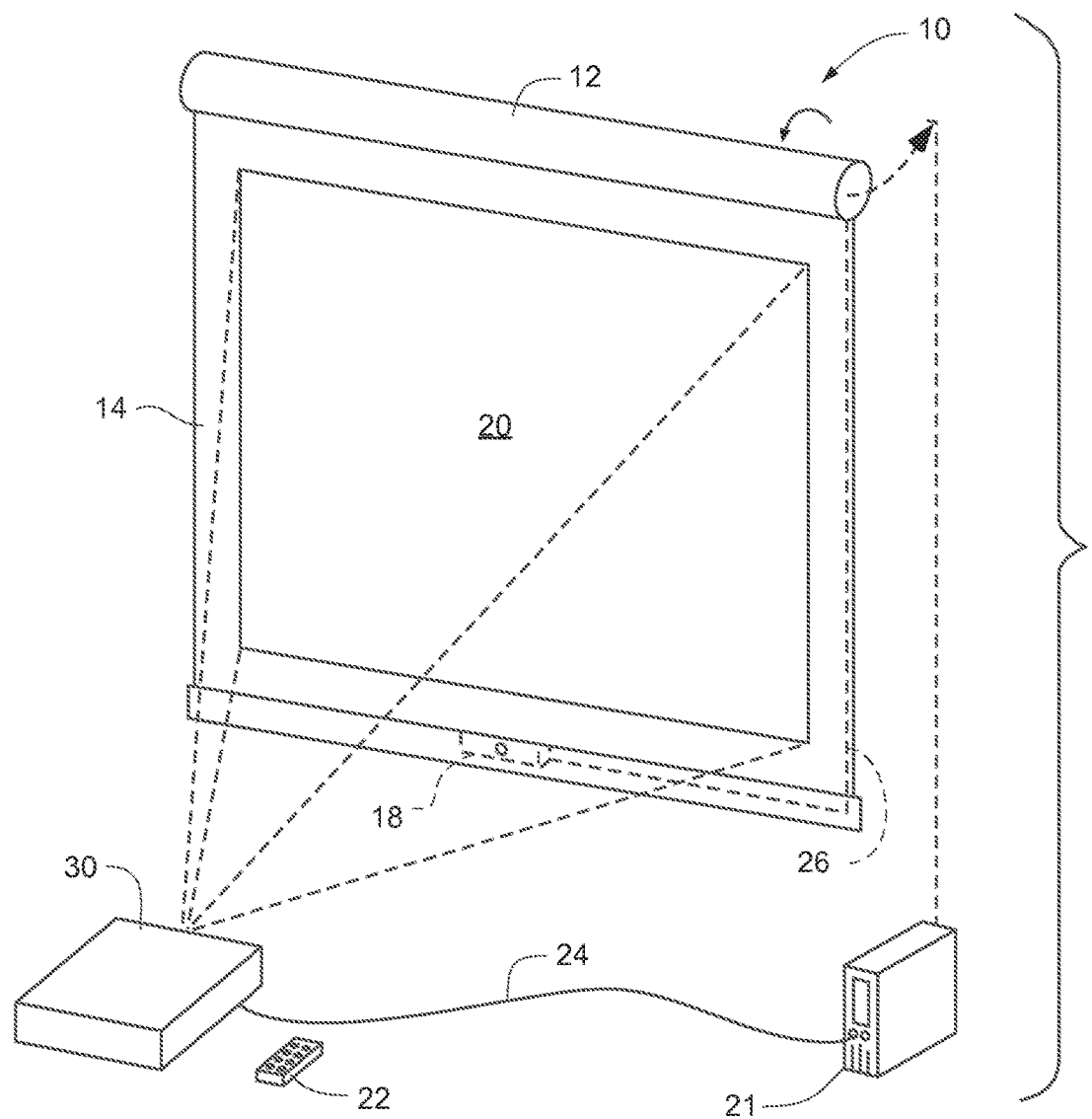
FIG. 3 is a front isometric view of another embodiment of the projector and projection screen with an interactive device integrated in the bottom rail of the screen, with the interactive device communicatively coupled by a wired connection.

In another embodiment depicted in FIG. 3, interactive device 18 can be coupled with communicating device 21 through a wired connection 26. The wires for this connection can be concealed in bottom rail 16 and along a margin of the screen 14 as depicted so as not to interfere with the projection and roll-up functioning of the screen. Alternatively, the wires extending from interactive device 18 can be concealed in any other suitable location.

It will be appreciated that projection screen apparatus 10 need not be an electric or manual roll-down screen as depicted, but could be a fixed-position projection screen while remaining within the scope of the invention. Moreover, interactive device 18 can be located near the horizontal center of bottom rail 18 as depicted, but could also be located anywhere along bottom rail 18 or elsewhere on projection screen apparatus 10, such as on roller device 12, as may be desired to facilitate the objectives of the present invention.

Figure 4:
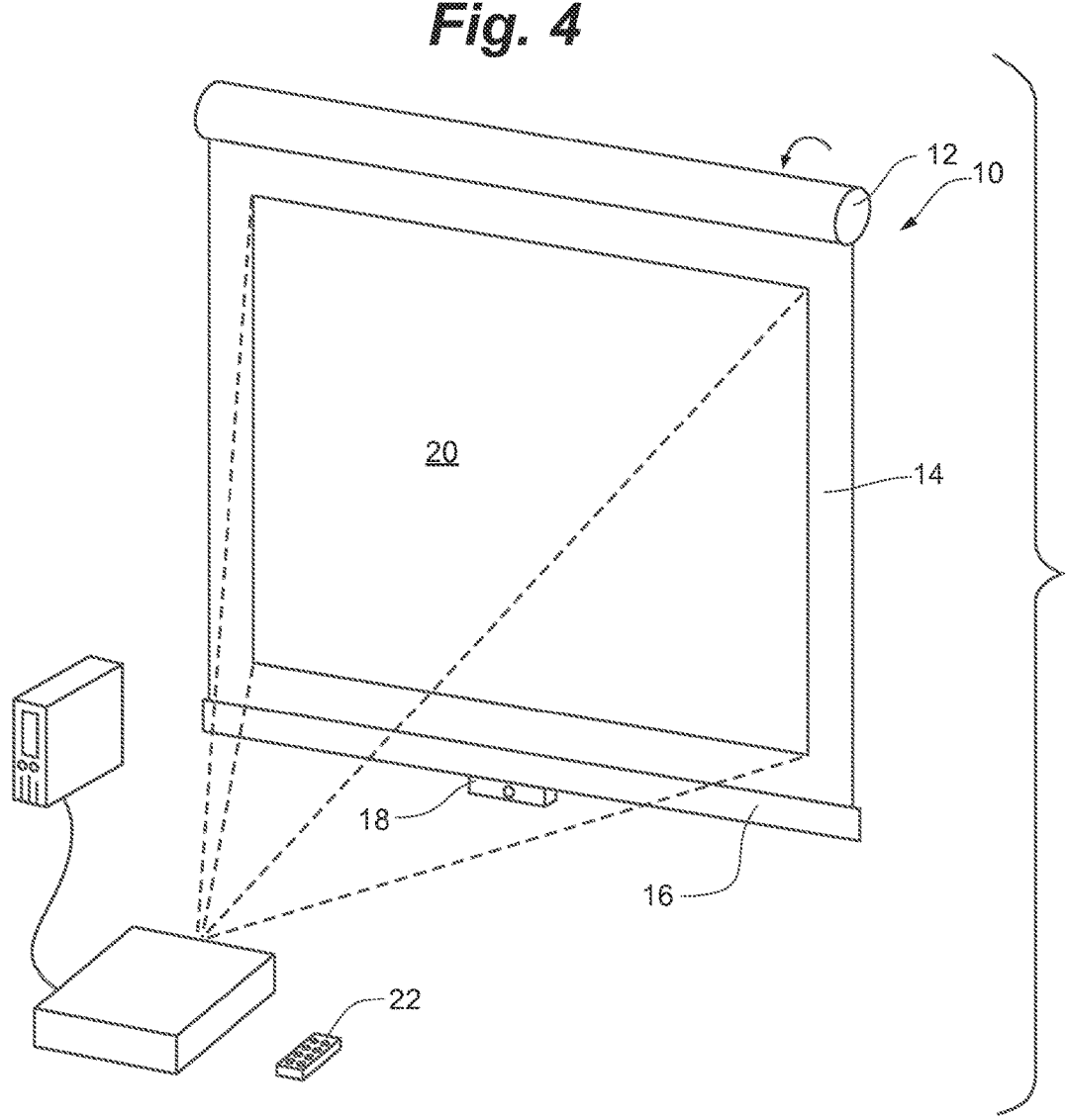
FIG. 4 is a front isometric view of another embodiment of the projector and projection screen with an interactive device attached to the bottom rail of the screen.

In an embodiment depicted in FIG. 4, interactive device 18 can also be attached to, but separate from, bottom rail 16. This embodiment may be especially suited to retrofitting an existing screen with interactive device 18. The communicative link from interactive device 18 to device 21 can be by wireless or wired means as set forth above.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A projection screen comprising:
    a screen presenting a surface suitable for projecting an image thereon, the screen having a top edge and a bottom edge located on opposite sides of the screen, the bottom edge coupled to a bottom rail;
    a screen roller device operably coupled to the top edge of the screen, the screen roller device adapted to vertically extend and retract the bottom rail of the screen solely by rolling the screen on the screen roller device; and
    a video camera operably coupled to the bottom rail of the screen such that the video camera is not blocked by the screen regardless of screen position, the video camera communicatively coupled to a communicating device.

2. The projection screen of claim 1, further comprising a controller operably coupled to the bottom rail of the screen.

3. The projection screen of claim 2, wherein the controller includes a processor.

4. The projection screen of claim 1, wherein the video camera is communicatively coupled to the communicating device with a wireless connection.

5. The projection screen of claim 1, wherein the video camera is communicatively coupled to the communicating device with a wired connection.

6. The projection screen of claim 1, wherein the video camera is integrated with the bottom rail of the screen.

7. The projection device of claim 1, wherein the video camera is attached to the bottom rail of the screen.

8. A projection system comprising:
    a projector;
    a screen presenting a surface suitable for displaying an image projected by the projector thereon, the screen having a top edge and a bottom edge located on opposite sides of the screen, the bottom edge coupled to a bottom rail;
    a screen roller device operably coupled to the top edge of the screen, the screen roller device adapted to vertically extend and retract the bottom rail of the screen solely by rolling the screen on the screen roller device; and
    a video camera operably coupled to the bottom rail of the screen such that the video camera is not blocked by the screen regardless of screen position, the video camera communicatively coupled to a communicating device.

9. The projection system of claim 8, further comprising a controller operably coupled to the bottom rail of the screen.

10. The projection system of claim 9, wherein the controller includes a processor.

11. The projection system of claim 8, wherein the video camera is communicatively coupled to the communicating device with a wireless connection.

12. The projection system of claim 8, wherein the video camera is communicatively coupled to the communicating device with a wired connection.

13. The projection system of claim 8, wherein the video camera is integrated with the bottom rail of the screen.

14. The projection system of claim 8, wherein the video camera is attached to the bottom rail of the screen.

15. The projection system of claim 8, further comprising a remote control for operating the projector.

* * * * *